(12) United States Patent
Kornilovich et al.

(10) Patent No.: US 12,220,701 B2
(45) Date of Patent: Feb. 11, 2025

(54) MICROFLUIDIC VALVES

(71) Applicant: HEWLETT-PACKARD DEVELOPMENT COMPANY, L.P., Spring, TX (US)

(72) Inventors: Pavel Kornilovich, Corvallis, OR (US); Daniel C. Curthoys, Corvallis, OR (US); Alexander N. Govyadinov, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 889 days.

(21) Appl. No.: 17/047,930

(22) PCT Filed: Jun. 11, 2018

(86) PCT No.: PCT/US2018/036977
§ 371 (c)(1),
(2) Date: Oct. 15, 2020

(87) PCT Pub. No.: WO2019/240764
PCT Pub. Date: Dec. 19, 2019

(65) Prior Publication Data
US 2021/0170408 A1  Jun. 10, 2021

(51) Int. Cl.
*B01L 3/00* (2006.01)
*F16K 99/00* (2006.01)

(52) U.S. Cl.
CPC .... *B01L 3/502738* (2013.01); *F16K 99/0017* (2013.01); *F16K 99/0036* (2013.01); *B01L 2400/0442* (2013.01); *B01L 2400/0688* (2013.01)

(58) Field of Classification Search
CPC ....... B01L 3/502738; B01L 2400/0442; B01L 2400/0688; F16K 99/0017; F16K 99/0036; F16K 99/0048; F16K 99/0051; F16K 99/0053
See application file for complete search history.

(56) References Cited

U.S. PATENT DOCUMENTS

| | | | |
|---|---|---|---|
| 6,454,387 B1 | 9/2002 | Haldorsen | |
| 2002/0008032 A1* | 1/2002 | Hayenga | B01F 33/30 204/603 |
| 2003/0215335 A1* | 11/2003 | Crivelli | B01L 3/50273 417/208 |
| 2004/0072357 A1* | 4/2004 | Stiene | A61B 5/150358 422/400 |
| 2004/0206408 A1 | 10/2004 | Peters | |

(Continued)

FOREIGN PATENT DOCUMENTS

| | | |
|---|---|---|
| EP | 1612429 A2 | 1/2006 |
| EP | 1612430 A2 | 1/2006 |

(Continued)

*Primary Examiner* — Elizabeth A Robinson
*Assistant Examiner* — Sophia Y Lyle
(74) *Attorney, Agent, or Firm* — Foley & Lardner LLP (57) ABSTRACT

A microfluidic valve may include a first portion of a liquid conduit to contain a fluid, a second portion of the liquid conduit to contain a liquid and a constriction between the first portion and the second portion and across which a capillary meniscus is to form between the fluid and liquid, the constriction comprising an edge along a ceiling of the constriction.

12 Claims, 5 Drawing Sheets

(56) References Cited

U.S. PATENT DOCUMENTS

| | | | |
|---|---|---|---|
| 2005/0266571 A1* | 12/2005 | Stout | G01N 27/3271 |
| | | | 436/55 |
| 2006/0000709 A1* | 1/2006 | Bohm | F16K 99/0001 |
| | | | 422/68.1 |
| 2007/0059216 A1* | 3/2007 | Larsson | B01L 3/502746 |
| | | | 422/400 |
| 2008/0050102 A1 | 2/2008 | Lamers | |
| 2012/0225446 A1* | 9/2012 | Wimberger-Friedl | ...................... |
| | | | B01L 3/5025 |
| | | | 29/592 |
| 2013/0121893 A1* | 5/2013 | Delamarche | B01L 3/502746 |
| | | | 422/503 |

FOREIGN PATENT DOCUMENTS

| WO | WO-2006061025 A2 | 6/2006 | |
|---|---|---|---|
| WO | WO-2008113112 A1 * | 9/2008 | ........ B01L 3/502738 |
| WO | WO-2011146145 A1 | 11/2011 | |
| WO | WO-2011156855 A1 | 12/2011 | |
| WO | WO-2017180120 A1 | 10/2017 | |

* cited by examiner

MICROFLUIDIC VALVES

CROSS-REFERENCE TO RELATED APPLICATIONS

This Utility Patent Application is a U.S. National Stage filing under 35 U.S.C. § 371 of PCT/US2018/036977, filed Jun. 11, 2018, incorporated by reference herein.

BACKGROUND

Microfluidics technology has found many applications in the biomedical field, cell biology, protein crystallization and other areas. Such microfluidic technology may include microfluidic valves that control the passage of liquid through a conduit. The scale of microfluidics presents many design challenges with respect to such microfluidic valves.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed herein are various example microfluidic valves that avoid much of the reliability issues and fabrication complexities found in many existing microfluidic valves. The disclosed microfluidic valves utilize a constriction in a conduit at an interface of a fluid and a liquid such that a capillary meniscus forms between the fluid and the liquid. For purposes of this disclosure, the term "fluid" refers to a gas or a second liquid that is immiscible with respect to the liquid. For example, in one implementation, the liquid may comprise water while the fluid comprises a second immiscible liquid in the form of an oil. The disclosed microfluidic valves further reduce liquid creep through and across a meniscus which might otherwise result in the valve being unintentionally opened. As a result, the disclosed microfluidic valves may resist greater liquid pressures prior to the meniscus being broken and the valve being opened.

In one implementation, the constriction of the example microfluidic valves includes a ceiling edge, wherein the ceiling edge increases strength of the meniscus, increasing the amount of liquid pressure that the valve may resist before the meniscus is broken. In another implementation, the disclosed microfluidic valves include a liquid phobic surface in the fluid portion of the conduit and extending from or proximate to the constriction and the formed meniscus. The liquid phobic surface resists liquid creep along edges of the formed meniscus, increasing the strength of the resistance provided by the meniscus, and thereby increasing the strength of the microfluidic valve. In one implementation, the constriction of the microfluidic valve has a floor edge that increases strength of the meniscus, wherein the meniscus may be selectively broken using a fluid actuator.

In some implementations, the valve is actuatable to an open state by a meniscus breaker that breaks the menisci extending across the constriction. Breaking of the menisci across the constriction allows liquid to flow and establish a continuous string or stream of liquid through the conduit. In one implementation, the meniscus breaker may comprise a fluid actuator that displaces fluid to increase fluid pressure on at least one of the menisci so as to break the meniscus. In another implementation, the meniscus breaker may comprise a device that produces sufficient vibration to break at least one of the menisci.

In some implementations, strength and robustness of the formed meniscus that closes the microfluidic valve is further enhanced by providing the constriction at the end of a spout. The spout projects into the portion of the conduit containing fluid. In some implementations, reliability of the microfluidic valve is further enhanced by providing a series of constrictions, wherein different menisci are formed in series across the series of constrictions. Opening of the valve involves breaking each of the sequentially formed menisci.

In some implementations, the liquid conduit comprises a microfluidic passage. Microfluidic passages may be formed by performing etching, microfabrication (e.g., photolithography), micromachining processes, or any combination thereof in a substrate of a fluidic die in which the liquid conduit may be disposed. Some example substrates may include silicon-based substrates, glass-based substrates, gallium arsenide-based substrates, and/or other such suitable types of substrates for microfabricated devices and structures. Accordingly, microfluidic channels, passages, chambers, orifices, and/or other such features may be defined by surfaces fabricated in the substrate of the fluidic die. Furthermore, as used herein a microfluidic channel or passage may correspond to a channel of sufficiently small size (e.g., of nanometer sized scale, micrometer sized scale, millimeter sized scale, etc.) to facilitate conveyance of small volumes of fluid (e.g., picoliter scale, nanoliter scale, microliter scale, milliliter scale, etc.).

Figure 1:
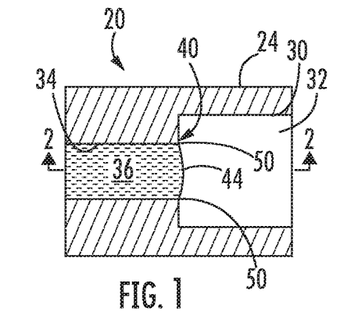
FIG. 1 is a top sectional view of portions of an example microfluidic valve.
Figure 2:
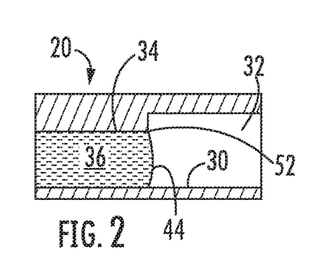
FIG. 2 is a side sectional view of portions of the example microfluidic valve of FIG. 1.

FIGS. 1 and 2 schematically illustrate portions of an example microfluidic valve 20. Microfluidic valve 20 comprises a device for controlling the passage of a liquid through a conduit. FIGS. 1 and 2 illustrate microfluidic valve 20 in a closed state in which fluid flow through the valve 20 is obstructed or stopped by a capillary meniscus. Microfluidic valve 20 comprises liquid conduit 24.

Conduit 24 comprises a body or structure having an interior along which liquid is to flow when valve 20 is open. Conduit 24 comprises a first interior or a first portion 30 that is to contain a fluid 32 and a second interior or second portion 34 that is supplied with or is to contain a liquid 36. As shown by FIG. 1, portions 30 and 34 are joined or connected to one another at a constriction 40. A constriction is an interface where a conduit undergoes dimensional changes from a larger flow passage to a smaller flow passage.

Constriction 40 provides a structure at which a capillary meniscus may form. Because the constriction 40 is formed between or along a gas-liquid or immiscible fluid/liquid interface between the two portions 30, 34 of conduit 24, capillary meniscus 44 may form across constriction 40. In particular, portions 34 and 36 are sized such that the liquid 36 within first portion 34 forms the capillary meniscus 44 along the fluid-liquid interface of the two portions. This capillary meniscus 44 serves as a valve to stop liquid flow through conduit 24. Actuation or opening of this valve provided by capillary meniscus 44 may occur through breaking of the capillary meniscus 44.

As shown by FIG. 1 constriction 40 comprises a pair of opposite side corners or edges 50. Edges 50 facilitate the formation of meniscus 44. However, in some implementations, edges 50, alone, may not reliably maintain the meniscus 44 over time or in response to pressure increases. As shown by FIG. 2, constriction 40 additionally comprises a ceiling corner or edge 52. Ceiling edge 52 occurs at a juncture where the shorter vertical height of first portion 34 meets the taller or larger vertical height of second portion 30. Ceiling edge 52 increases the strength of the formed meniscus 44, increasing the liquid pressure that the capillary meniscus 44 may resist prior to being broken. As a result, ceiling edge 52 increases the strength of microfluidic valve 20.

In the example illustrated, ceiling edge 52 comprises a sharp or relatively sharp corner. The relatively sharp corner providing ceiling edge 52 provides enhanced meniscus strength. Although possibly offering a less robust meniscus, ceiling edge 52 may be curved or rounded in other implementations.

Figure 3:
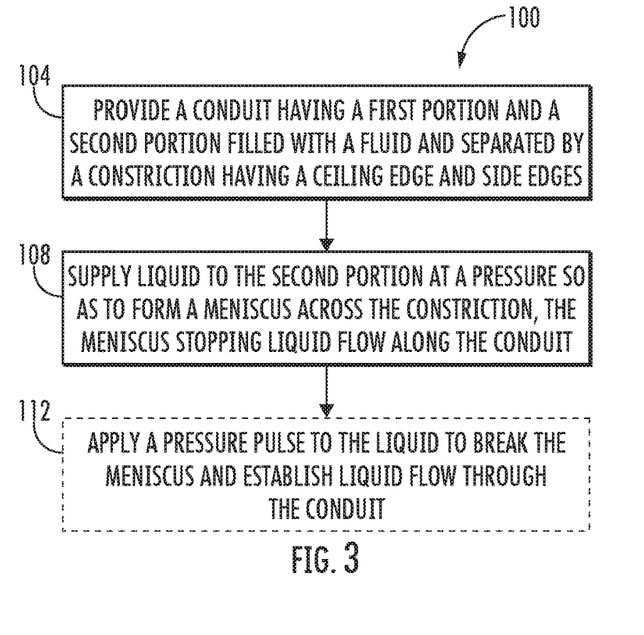
FIG. 3 is a flow diagram of an example liquid flow control method for operating a microfluidic valve.

FIG. 3 is a flow diagram of an example method 100 for operating a microfluidic valve. Method 100 facilitates the control over the flow of fluid through a conduit in a microfluidic device with enhanced reliability and with a valve that may have fewer fabrication complexities. Although method 100 is described as being carried out with microfluidic valve 20 described above, it should be appreciated that method 100 may likewise be carried out with any of the microfluidic valves described hereafter or with other similar microfluidic valve constructions.

As indicated by block 104, a conduit 24 is provided. The conduit has a first portion 34 and a second portion 30 filled with a fluid and separated by a constriction 40 having a ceiling edge 52 and side edges 50. As indicated by block 108, liquid is supplied to the second portion at a pressure so as to form a capillary meniscus 44 across the constriction 40. The exact value of the pressure of the liquid being supplied to form meniscus 44 may vary depending upon the dimensions, size and shape of constriction 40, the liquid phobic/liquid philic properties of the surfaces forming the interior portion of conduit 24, and the properties of the liquid 36 itself. The meniscus 44 stops liquid flow along conduit 24. As a result, a microfluidic valve in a closed state is formed.

As indicated by broken lines and block 112, liquid flow across valve 20 and through conduit 24 may be established by opening the microfluidic valve. To open the microfluidic valve, a pressure pulse may be applied to the liquid 36 to break the meniscus 44 and establish liquid flow through the conduit 24. In one implementation, pressure pulse may be generated by a meniscus breaker. In one implementation, the meniscus breaker may comprise a fluid actuator that displaces fluid. In one implementation, the meniscus breaker may comprise a vibration generating mechanism.

Figure 4A:
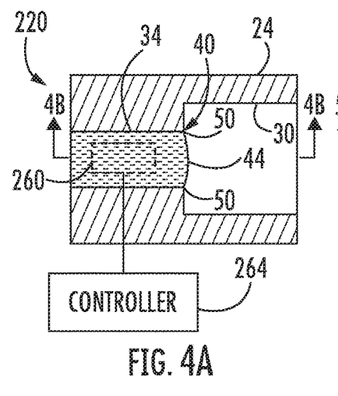
FIG. 4A is a top sectional view of portions of an example microfluidic valve in a closed state.
Figure 4B:
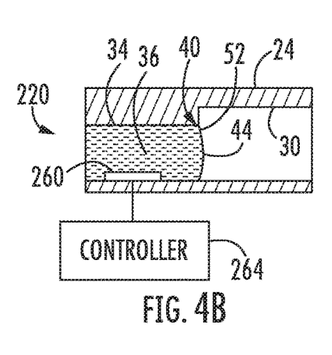
FIG. 4B is a side sectional view of portions of the example microfluidic valve of FIG. 4A.
Figure 5A:
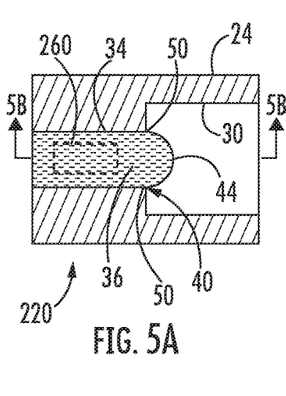
FIG. 5A is a top sectional view of portions of the microfluidic valve of FIG. 4A during opening of the valve.
Figure 5B:
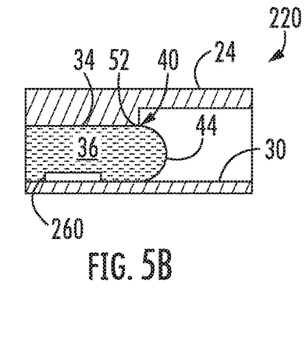
FIG. 5B is a side sectional view of portions of the example microfluidic valve of FIG. 5A.
Figure 6A:
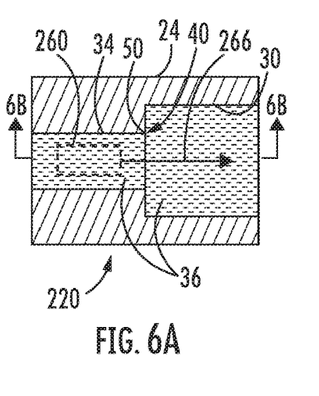
FIG. 6A is a top sectional view of portions of the microfluidic valve of FIG. 4A in an open state.
Figure 6B:
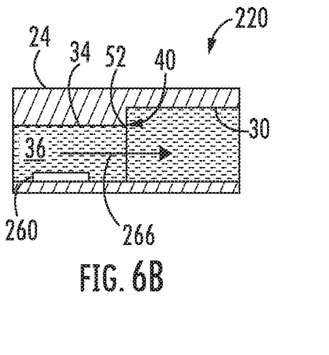
FIG. 6B is a side sectional view of portions of the example microfluidic valve of FIG. 6A.

FIGS. 4A and 4B illustrate top sectional and side sectional views, respectively, of portions of an example microfluidic valve 220 in a closed state, stopping the flow of liquid through or across the microfluidic valve 220. FIGS. 5A and 5B illustrate microfluidic valve 220 in the process of being opened. FIGS. 6A and 6B illustrate microfluidic valve 220 after being opened, with liquid flowing through microfluidic valve 220.

Microfluidic valve 220 is similar to microfluidic valve 20 described above except that microfluidic valve 220 additionally comprises meniscus breaker 260 and controller 264.

For ease of illustration, controller 264 is not illustrated in FIG. 5A, 5B, 6A or 6B. Those components of microfluidic valve 220 that correspond to components of microfluidic valve 20 are numbered similarly.

Meniscus breaker 260 comprises a device that, upon being actuated by controller 264, breaks the capillary meniscus 44 extending across constriction 40 and maintaining valve 220 in a closed state. In one implementation, meniscus breaker 260 may comprise a liquid pump, such as an inertial pump that increases the pressure of the adjacent liquid to a sufficient extent so as to break the corresponding meniscus extending across constriction 40. In one implementation, meniscus breaker 260 comprises a fluid actuator that displaces fluid to create a pressure pulse in liquid 36. Examples of such a fluid actuator that may be utilized include, but are not limited to, thermal actuators, piezo-membrane-based actuators, electrostatic membrane actuators, mechanical/impact driven membrane actuators, magnetostrictive drive actuators, electrochemical actuators, other such microdevices, or any combination thereof. In one implementation, meniscus breaker 260 comprises a thermal resistor that vaporizes the adjacent fluid to create a bubble that displaces adjacent liquid to break the corresponding meniscus. In other implementations, meniscus breaker 260 may comprise micro-electromechanical systems that vibrate to a sufficient extent so as to break the adjacent meniscus.

Controller 264 controls actuation of meniscus breaker 260. In one implementation, controller 264 comprises a processing unit that follows instructions contained in a non-transitory computer-readable medium. In another implementation, controller 264 comprises an integrated circuit, such as an application-specific integrated circuit (ASIC). Controller 264 outputs control signals that initiate, terminate or adjust operation of meniscus breaker 260.

In one implementation, meniscus breaker 260 comprises an electrically driven device, such as an electrically driven fluid actuator or electrically driven vibrator contained in the same substrate or layer/collection of layers that form and define conduit 24. For example, meniscus breaker 260 and conduit 24 may be formed as part of a single microfluidic circuit chip or die. In such an implementation, the single microfluidic circuit chip or die may comprise switches in the form of transistors which are actuated in response to signals from controller 264. In one implementation, controller 264 may also be formed or provided upon the single microfluidic circuit chip or die that also supports meniscus breaker 260 and defines conduit 24. In yet another implementation, controller 264 may be remote from the circuit chip or die including meniscus breaker 260 and conduit 24, wherein a communication interface, such as a contact pad, port or other connector, is provided on the circuit chip or die for connection to the remote controller 264.

In operation, liquid flow through microfluidic valve 220 is initially controlled and stopped by initially supplying liquid 36 to portion 34 of conduit 24 at a pressure chosen so as to form meniscus 44 across constriction 40, stopping liquid flow along conduit 24. As discussed above, the ceiling edge 52 increases the reliability and robustness of the formed meniscus 44 to reduce the likelihood of accidental breakage of meniscus 44 and accidental opening of microfluidic valve 220.

As shown by FIGS. 5A and 5B, when microfluidic valve 220 is to be opened, controller 264 outputs control signals actuating meniscus breaker 260. In one implementation, meniscus breaker 260 applies a pressure pulse to the liquid 36 in portion 34. As discussed above, the pressure pulse may be created by displacing fluid, for example by vaporizing a portion of liquid, or vibrating the liquid 36 within portion 34 of conduit 24. This pressure pulse results in meniscus 44 expanding into portion 30 as shown in FIGS. 5A and 5B, eventually breaking to establish liquid flow through conduit 24 as indicated by arrows 266 in FIGS. 6A and 6B.

Figures 7A, 7B, 8A, 8B, 9A, 9B, 10A, 10B, 11A, 11B, 12A, 12B, 12C:
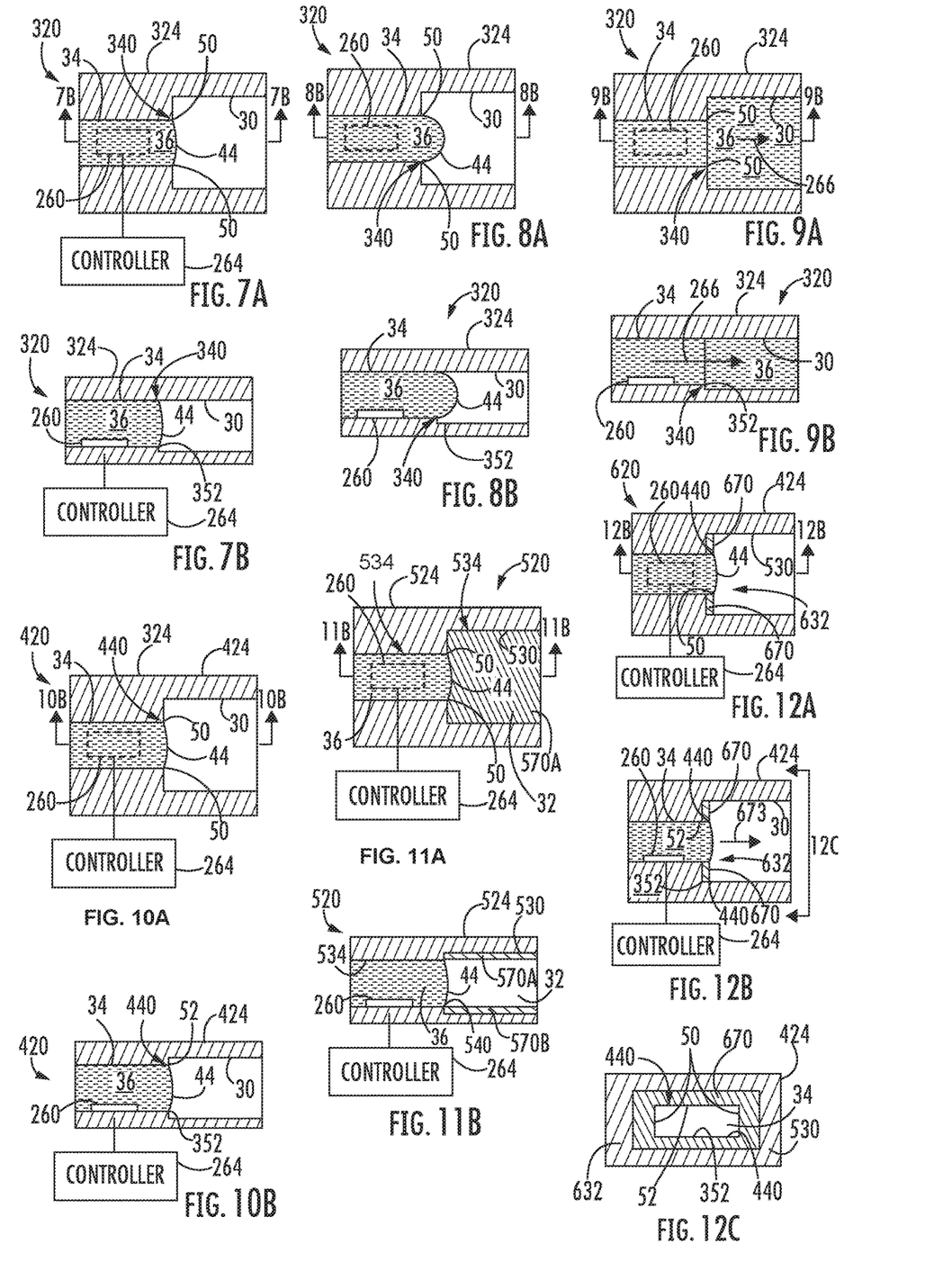
FIG. 7A is a top sectional view of portions of an example microfluidic valve in a closed state.
FIG. 7B is a side sectional view of portions of the example microfluidic valve of FIG. 7A taken along line 7B-7B
FIG. 8A is a top sectional view of portions of the example microfluidic valve of FIG. 7A during opening of the valve.
FIG. 8B is a side sectional view of portions of the example microfluidic valve of FIG. 8A taken along line 8B-8B.
FIG. 9A is a top sectional view of portions of the example microfluidic valve of FIG. 7A in an open state.
FIG. 9B is a side sectional view of portions of the example microfluidic valve of FIG. 9A taken along line 9B-9B.
FIG. 10A is a top sectional view of portions of an example microfluidic valve in a closed state.
FIG. 10B is a side sectional view of the microfluidic valve of FIG. 10A taken along line 10B-10B.
FIG. 11A is a top sectional view of portions of an example microfluidic valve in a closed state.
FIG. 11B is a side sectional view of the microfluidic valve of FIG. 11A taken along line 11B-11B.
FIG. 12A is a top sectional view of portions of an example microfluidic valve in a closed state.
FIG. 12B is a side sectional view of the microfluidic valve of FIG. 12A taken along line 12B-12B.
FIG. 12C is a side view of the microfluidic valve of FIG. 12B taken along line 12C-12C.

FIGS. 7A and 7B illustrate top sectional and side sectional views, respectively, of portions of an example microfluidic valve 320 in a closed state, stopping the flow of liquid through or across the microfluidic valve 320. FIGS. 8A and 8B illustrate microfluidic valve 320 in the process of being opened. FIGS. 9A and 9B illustrate microfluidic valve 320 after being opened, with liquid flowing through microfluidic valve 320.

Microfluidic valve 320 is similar to microfluidic valve 220 described above except that microfluidic valve 320 comprises conduit 324 having a constriction 340 with floor edge 352. Those components of microfluidic valve 320 that correspond to components of microfluidic valve 220 are numbered similarly. For ease of illustration, controller 264 is not illustrated in FIG. 8A, 8B, 9A or 9B.

Floor edge 352 occurs at a juncture where the floor of first portion 34 meets the deeper vertical height of second portion 30. Floor edge 352 increases the strength of the formed meniscus 44, increasing the liquid pressure that the capillary meniscus 44 may resist prior to being broken. As a result, floor edge 352 increases the strength of microfluidic valve 20.

In the example illustrated, floor edge 352 comprises a sharp or relatively sharp corner. The relatively sharp corner of floor edge 352 provides enhanced capillary meniscus strength. Although possibly offering a less robust capillary meniscus, floor edge 352 may be curved or rounded in other implementations.

In operation, liquid flow through microfluidic valve 320 is initially controlled and stopped by initially supplying liquid 36 to portion 34 of conduit 324 at a pressure chosen so as to form meniscus 44 across constriction 340, stopping liquid flow along conduit 324. The exact value of the pressure of the liquid being supplied to form meniscus 44 may vary depending upon the dimensions, size and shape of constriction 40, the liquid phobic/hydrophilic properties of the surfaces forming the interior portion of conduit 324 and the properties of the liquid 36 itself. As discussed above, the floor edge 352 increases the reliability and robustness of the formed meniscus 44 to reduce the likelihood of accidental breakage of capillary meniscus 44 and accidental opening of microfluidic valve 320.

As shown by FIGS. 8A and 8B, when microfluidic valve 320 is to be opened, controller 264 outputs control signals actuating meniscus breaker 260. In one implementation, meniscus breaker 260 applies a pressure pulse to the liquid 36 in portion 34. As discussed above, the pressure pulse may be created by displacing fluid or vibrating the liquid 36 within portion 34 of conduit 324. This pressure pulse results in meniscus 44 expanding into portion 30 as shown in FIGS. 8A and 8B, eventually breaking to establish liquid flow through conduit 324 as indicated by arrows 266 in FIGS. 9A and 9B.

FIGS. 10A and 10B illustrate top sectional and side sectional views, respectively, of portions of an example microfluidic valve 420 in a closed state, stopping the flow of liquid through or across the microfluidic valve 420. Microfluidic valve 420 is similar to microfluidic valves 220 and 320 described above in that microfluidic valve 420 comprises a constriction 440 having both a ceiling edge 52 and floor edge 352. Those components of microfluidic valve 420 that correspond to components of microfluidic valves 220 and 320 are numbered similarly. Although the ceiling edge 52 and floor edge 352 are illustrated as having equal heights, in other implementations, the ceiling edge 52 and the floor edge 352 may have different heights.

Ceiling edge 50 and floor edge 352, combined with side edges 50, provide a continuous edge or corner about the juncture interface between portions 30 and 34. This continuous edge provides an even more robust and stronger meniscus 44 that is less likely to accidental breakage which might result in accidental opening of microfluidic valve 420. As with microfluidic valves 220 and 320, microfluidic valve 420 may be selectively opened through the output of control signals from controller 264 to meniscus breaker 260, causing meniscus breaker 260 to apply a pressure pulse to liquid 36 to break the meniscus 44 and establish liquid flow through conduit 424.

FIGS. 11A and 11B illustrate top sectional and side sectional views, respectively, of portions of an example microfluidic valve 520 in a closed state, stopping the flow of liquid through or across the microfluidic valve 520. FIGS. 11A and 11B illustrate microfluidic valve 520 in a closed state in which fluid flow through the valve 520 is obstructed or stopped by a capillary meniscus 44. Microfluidic valve 520 comprises liquid conduit 524.

Conduit 524 comprises a body or structure having an interior along which liquid is to flow when valve 520 is open. Conduit 524 comprises a first interior or a first portion 530 that is to contain a fluid 32 and a second interior or second portion 534 that is supplied with or is to contain a liquid 36. Portions 530 and 534 are joined or connected to one another at a constriction 540. A constriction is an interface where a conduit undergoes dimensional changes from a larger flow passage to a smaller flow passage.

Constriction 540 provides a structure at which a capillary meniscus may form. Because the constriction 540 is formed between or along a fluid-liquid interface between the two portions 530, 534 of conduit 524, capillary meniscus 44 may form across constriction 540. In particular, portions 534 and 536 are sized such that the liquid 36 within first portion 534 forms the capillary meniscus 44 along the fluid-liquid interface of the two portions. This capillary meniscus 44 serves as a valve to stop liquid flow through conduit 524. Actuation or opening of this valve provided by capillary meniscus 44 may occur through breaking of the capillary meniscus 44.

As shown by FIG. 11A, constriction 540 comprises a pair of opposite side corners or edges 50. Edges 50 facilitate the formation of meniscus 44. However, in some implementations, edges 50, alone, may not reliably maintain the meniscus 44 over time or in response to pressure increases. As shown by FIG. 11B, microfluidic valve 520 additionally comprises liquid phobic surfaces 570A, 570B (collectively referred to as surfaces 570). Liquid phobic surfaces 570 extend along interior surfaces of portion 530 of conduit 524. Liquid phobic surface 570A extends along the ceiling of portion 530 while liquid phobic surface 570B extends along the floor of portion 530. Liquid phobic surfaces 570 extend from constriction 540, away from constriction 540 or from regions in close proximity to constriction 540 away from constriction 540 in portion 530. Liquid phobic surfaces 570 repel liquid 36 to inhibit the creep of liquid 36 past constriction 540 and onto the floor or ceiling of portion 530.

In one implementation, liquid phobic surfaces 570 are formed from a hydrophobic material such as polytetrafluoroethylene. In other implementations, liquid phobic surface 570 may be formed from other liquid phobic materials, materials that are phobic to (that repel) the liquid to be supplied to portion 534 of conduit 524. In one implementation, liquid phobic surfaces 570 are formed by a thin film or coating deposited upon the floor and ceiling of portion 530, wherein the thin film or coating slightly project below the floor and ceiling, respectively, of portion 534 at constriction 540. In another implementation, liquid phobic surfaces 570 are formed by layers of liquid phobic material slightly recessed into the floor and ceiling of constriction 540 such that the interior most surfaces of liquid phobic surface 570 are flush with or slightly recessed from the floor and ceiling of portion 534 at constriction 540. In some implementations, one of liquid phobic surfaces 570A, 570B may be omitted.

In one implementation, constriction 540 has a smallest opening dimension (the smallest dimension of the height or width of the opening forming constriction 540). In such an implementation, each of liquid phobic surfaces 570 extend away from constriction 540 by a distance of at least 1 times the smallest opening dimension and no greater than 10 times the smallest opening dimension. In one implementation, each of the liquid phobic surfaces 570 extends away from constriction 540 by a distance of at least three times the smallest opening dimension and no greater than 10 times the smallest opening dimension. In such an implementation, the minimum distance by which liquid phobic surfaces 570 extend away constriction 540 facilitates the formation of a sufficiently robust meniscus 44. In such an implementation, the maximum distance by which liquid phobic surfaces 570 may extend away from constriction 540 facilitates reliable opening of microfluidic valve 520 by meniscus breaker 260 in response to control signals from controller 264.

FIGS. 12A and 12B illustrate top sectional and side sectional views, respectively, of portions of an example microfluidic valve 620 in a closed state, stopping the flow of liquid through or across the microfluidic valve 620. Microfluidic valve 620 is similar to microfluidic valve 420 described above in that microfluidic valve 620 comprises a constriction 440 having side edges 50, ceiling edge 52 and floor edge 352. Unlike microfluidic valve 420, microfluidic valve 620 additionally comprises liquid phobic surfaces 670 (shown with an enlarged thickness for purposes of illustration). Those components of microfluidic valve 620 that correspond to components of microfluidic valves 220, 320, and 420 are numbered similarly.

FIG. 12C is a side view of the microfluidic valve of FIG. 12B taken along line 12C-12C. As shown by FIG. 12C, portion 530 of conduit 424 has a face 632 terminating at side edges 50, ceiling edge 52 and floor edge 352 of constriction 440 to define the mouth or opening between portions 530 and 34 of conduit 424. Liquid phobic surfaces 670 extend along face 632 about constriction 440, about the mouth or opening. Liquid phobic surfaces 670 reduce a likelihood of liquid within portion 34 from creeping past constriction 440 and onto face 632.

In one implementation, liquid phobic surfaces 670 are formed from a hydrophobic material such as polytetrafluoroethylene. In other implementations, liquid phobic surface 670 may be formed from other liquid phobic materials or materials that are phobic to (tending to repel) the liquid 36 to be supplied through portion 34 of conduit 424. In one implementation, liquid phobic surfaces 670 are formed by a thin film or coating deposited upon face 632. In another implementation, liquid phobic surfaces 670 are formed by layers of liquid phobic material slightly recessed into the face 632.

In the example illustrated, liquid phobic surfaces 670 do not cover an entirety of face 632, but a limited area of face 632 outwardly extending from edges 50, 52, 352. In other implementations, surfaces 670 may cover an entirety of face 632. Although surfaces 670 are illustrated as continuously extending about the opening defined by edges 50, 52, 352, in other implementations, surfaces 670 may comprise multiple spaced patches of liquid philic material or coatings about the opening defined by edges 50, 52, 352. In some implementations, the internal floor, ceiling and/or outer internal sides of portion 530 extending away from the mouth in the direction indicated by arrow 673 may additionally or alternatively be covered or at least partially covered by a liquid filling material.

Figure 13:
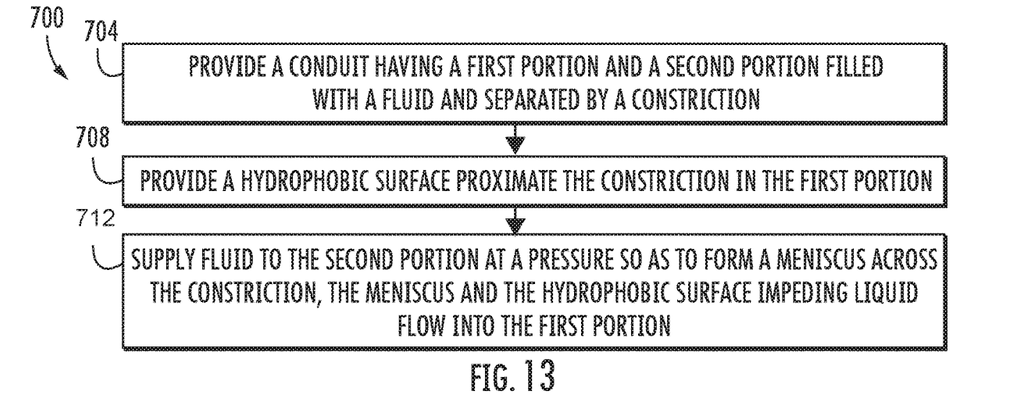
FIG. 13 is a flow diagram of an example liquid flow control method.

FIG. 13 is a flow diagram of an example method 700 for providing and controlling a microfluidic valve to control the flow of a liquid. As indicated by block 704, a conduit is provided, wherein the conduit has a first portion and a second portion filled with a fluid and separated by a constriction. As indicated by block 708, a hydrophobic surface is provided proximate the constriction in the first portion of the conduit. As indicated by block 712, fluid is supplied to the second portion of the conduit at a pressure so as to form a meniscus across the constriction. The meniscus and the hydrophobic surface impede liquid flow into the first portion.

Figure 14A:
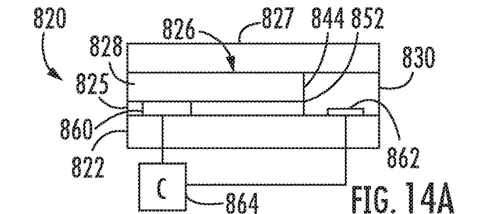
FIG. 14A is a side sectional view of an example microfluidic valve.
Figure 14B:
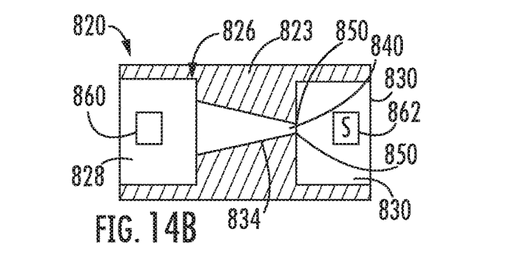
FIG. 14B is a top sectional view of the example microfluidic valve of FIG. 14A.

FIGS. 14A and 14B are side and top sectional views, respectively, illustrating an example microfluidic valve 820. Microfluidic valve 820 comprises substrate 822, chamber layer 823, floor layer 825, ceiling layer 827, meniscus breaker 860, flow sensor 862 and controller 864. Substrate 822 comprises a base layer upon which the remaining components of microfluidic valve 820 are formed. In one implementation, substrate 822 forms part of a microfluidic chip having microfluidic passages. Such microfluidic passages may be formed by performing etching, microfabrication (e.g., photolithography), micromachining processes, or any combination thereof in a substrate of a fluidic die. Some example substrates 822 may include silicon-based substrates, glass based substrates, gallium arsenide based substrates, and/or other such suitable types of substrates for microfabricated devices and structures. Accordingly, microfluidic channels, passages, chambers, orifices, and/or other such features may be defined by surfaces fabricated in the substrate of the fluidic die. Furthermore, as used herein a microfluidic channel or passage may correspond to a channel of sufficiently small size (e.g., of nanometer sized scale, micrometer sized scale, millimeter sized scale, etc.) to facilitate conveyance of small volumes of fluid (e.g., picoliter scale, nanoliter scale, microliter scale, milliliter scale, etc.).

Chamber layer 823 comprise a layer of material patterned upon substrate 822. In one implementation, chamber layer 823 extends on top of floor layer 825. In other implementations, chamber layer 823 extends around side portions of floor layer 825. Chamber layer 823 defines a liquid passage 826 comprising a liquid supply portion 828 and a liquid receiving portion 830 connected by a tapering portion 834. Tapering portion 834 narrows as it approaches receiving portion 830. Tapering portion 834 is joined to receiving portion 830 at a constriction 840. Chamber layer 823 forms side edges 850 which form opposite sides of constriction 840. In one implementation, chamber layer 823 comprises a layer of patterned material such as SU8, polyimide, polydimethylsiloxane (PDMS), etc.

Floor layer 825 comprises a layer of material extending below tapering portion 834. In the example illustrated, floor layer 825 additionally extends below supply portion 828. As shown by FIG. 14A, floor layer 825 rises above substrate 822, forming a floor edge 852 at constriction 840. In one implementation, floor layer 825 comprise a layer of an epoxy, such as SU8.

Ceiling layer 827 comprises a layer of material formed on top of chamber layer 823 and forming a ceiling of each of portions 828, 830 and 834. In one implementation, ceiling layer 827 comprises a layer of material such as a resist material, such as SU8, a polyimide, a PDMS, a glass, a cyclic olefin copolymer (COC), etc. In one implementation, ceiling layer 827 is formed by depositing a layer on top of the sacrificial material filling each of portions 828, 830 and 834, wherein upon hardening or solidification of the top at layer 827, the sacrificial material is removed. The completed combination of layers 822, 824, 827 and 830 forms a microfluidic valve having a constriction across which a capillary meniscus 844 may be formed when fluid is supplied under an appropriate pressure into portions 828 and 834. The meniscus inhibits liquid within portions 828 and 834 from flowing into or through receiving portion 830.

Meniscus breaker 860 is similar to meniscus breaker 260 described above. In one implementation, breaker 860 is formed upon substrate 822 and projects through a patterned opening in floor layer 825. In one implementation, meniscus breaker 860 may comprise a thermal resistor connected to electric conductive traces and transistors provided on substrate 822.

Sensor 862 comprises a component that senses the presence and/or flow of liquid within and through receiving portion 830 of passage 826. In one implementation, sensor 862 may comprise a wet-dry sensor. For example, in one implementation, sensor 862 may comprise spaced electrodes of a circuit, wherein the circuit completed within a liquid extending across and contacting the spaced electrodes. In such an implementation, a dry state may indicate that valve 820 is presently closed, that meniscus is intact and that no liquid is flowing through valve 820. A wet state would indicate the presence of liquid across sensor 862, indicating that meniscus 844 has been broken and that valve 820 has been opened. In another implementation, sensor 862 may comprise an electrical impedance sensor. In yet other implementations, sensor 862 may comprise an optical sensor. Signals from sensor 862 are communicated to controller 864.

Controller 864 is similar to controller 264 described above. Controller 864 controls actuation of meniscus breaker 860. In the example illustrated controller 864 controls actuation of meniscus breaker 860 based at least in part upon signals received from sensor 862. Such signals may indicate when the application of pressure pulses should be ceased by meniscus breaker 860. In some implementations, meniscus breaker 860 may further be utilized to pump fluid along passage 826. For example, in one implementation, meniscus breaker 860 may be formed as an inertial pump using the fluid actuator. In such an implementation, bumping provided by meniscus breaker 860 may be controlled by controller 864 based upon signals from sensor 862 to provide a selected flow rate of liquid or a selected flow rate of particles, cells or other objects carried by the flowing liquid. In one implementation, controller 864 comprises a processing unit that follows instructions contained in a non-transitory computer-readable medium. In another implementation, controller 864 comprises an integrated circuit, such as an application-specific integrated circuit (ASIC).

In one implementation, meniscus breaker 860 comprises an electrically driven device, such as an electrically driven fluid actuator or electrically driven vibrator contained in or on substrate layer 822. For example, meniscus breaker 860 and passage 826 may be formed as part of a single microfluidic circuit chip or die. In such an implementation, the single microfluidic circuit chip or die may comprise switches in the form of transistors which are actuated in response to signals from controller 864. In one implementation, controller 864 may also be formed or provided upon the single microfluidic circuit chip or die that also supports meniscus breaker 860 and defines liquid passage 826. In yet another implementation, controller 864 may be remote from the circuit chip or die including meniscus breaker 860 and liquid passage 866, wherein a communication interface, such as a contact pad, port or other connector is provided on the circuit chip or die or connection to the remote controller 864.

Figure 15A:
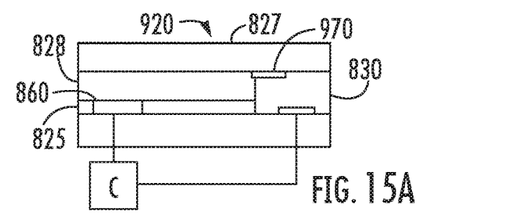
FIG. 15A is a side sectional view of an example microfluidic valve.
Figure 15B:
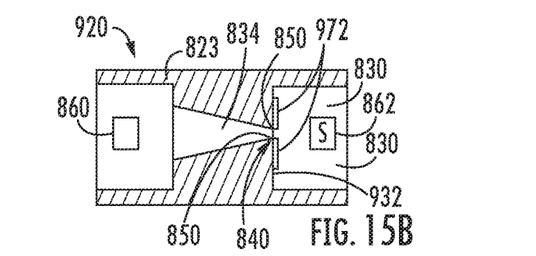
FIG. 15B is a top sectional view of the example microfluidic valve of FIG. 15A.

FIGS. 15A and 15B are side and top sectional views, respectively, illustrating an example microfluidic valve 920. Microfluidic valve 920 is similar to microfluidic valve 820 described above except that microfluidic valve 920 additionally comprises liquid phobic surfaces 970, 972. Those remaining components of microfluidic valve 920 that correspond to components of microfluidic valve 820 are numbered similarly.

Liquid phobic surface 970 is similar to liquid phobic surface 570A described above. As shown by FIG. 15A, liquid phobic surface 970 extends along a ceiling of portion 830, extending away from constriction 840. As shown by FIG. 15B, liquid phobic surface 972 is additionally provided on face 932 extending from opposite sides of constriction 940. Liquid phobic surfaces 970, 972 reduce a likelihood of liquid within portion 834 from creeping past constriction 840 and into portion 830.

Figure 16A:
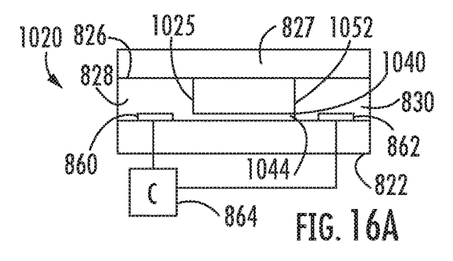
FIG. 16A is a side sectional view of an example microfluidic valve.
Figure 16B:
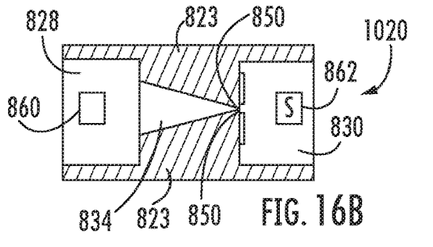
FIG. 16B is a top sectional view of the example microfluidic valve of FIG. 16A.

FIGS. 16A and 16B are side and top sectional views, respectively, illustrating portions of an example microfluidic valve 1020. Microfluidic valve 1020 is similar to microfluidic valve 820 except that microfluidic valve 1020 comprises overhead layer 1025 in place of floor layer 825. Those remaining components of microfluidic valve 1020 that correspond to components of microfluidic valve 820 are numbered similarly.

Overhead layer 1025 comprises a layer of material suspended from top at layer 827 and/or resting upon sides of chamber layer 823. Overhead layer 1025 extends above at least portions of portion 834 proximate to constriction 840. Overhead layer 1025 forms a ceiling edge 1052 which cooperates with side edges 850 to form constriction 1040. Ceiling edge 1052 facilitates the formation of a more robust meniscus 1044 across constriction 1040 to stop liquid flow from chamber 834 from portion 834 into portion 830. As discussed above, the formed meniscus is broken by meniscus breaker 860 in response to control signals from controller 864 which may be based at least in part upon signals from sensor 862. Breaking of the meniscus 1044 opens microfluidic valve 1020, permitting liquid to flow through and along portion 830 of passage 826.

Figure 17A:
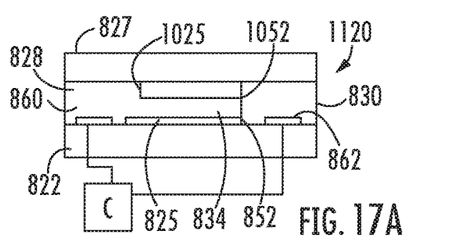
FIG. 17A is a side sectional view of an example microfluidic valve.
Figure 17B:
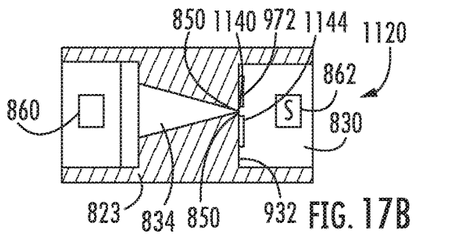
FIG. 17B is a top sectional view of the example microfluidic valve of FIG. 17A.

FIGS. 17A and 17B are top and side sectional views, respectively, illustrating portions of an example microfluidic valve 1120. Microfluidic valve 1120 is similar to microfluidic valves 820, 920 and 1020. Those components of microfluidic valve 1120 that correspond to components of valves 820, 920 and 1020 are numbered similarly. Similar to microfluidic valve 820, microfluidic valve 1120 comprises floor layer 825 providing floor edge 852. Similar to microfluidic valve 920, microfluidic valve 1120 comprises liquid phobic surfaces 972 along face 932. Similar to microfluidic valve 1020, microfluidic valve 1120 comprises overhead layer 1025, forming ceiling edge 1052. Side edges 850, floor edge 852 and ceiling edge 1052 form constriction 1140 which is completely surrounded by such edges along face 932. Liquid phobic surfaces 972 additionally inhibit accidental creep of liquid through constriction 1140. As a result, microfluidic valve 1120 provides a robust capillary meniscus 1144 when liquid flow is to be stopped. As in the above implementations, microfluidic valve 1120 may be opened by breaking the meniscus 1144 using pressure pulses or other stimuli provided by meniscus breaker 860 in response to signals from controller 864 which may be based at least in part upon signals from sensor 862.

Figure 18:
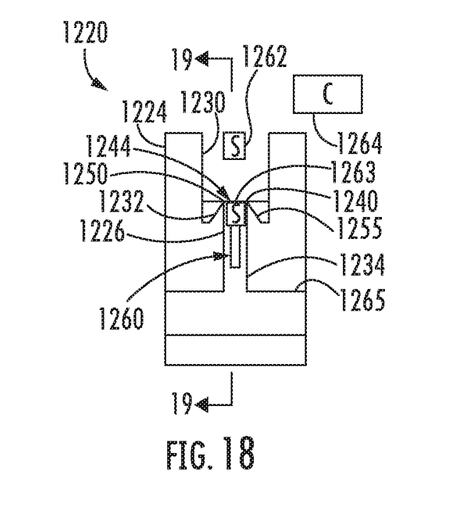
FIG. 18 is a top sectional view of portions of an example microfluidic valve.
Figure 19:
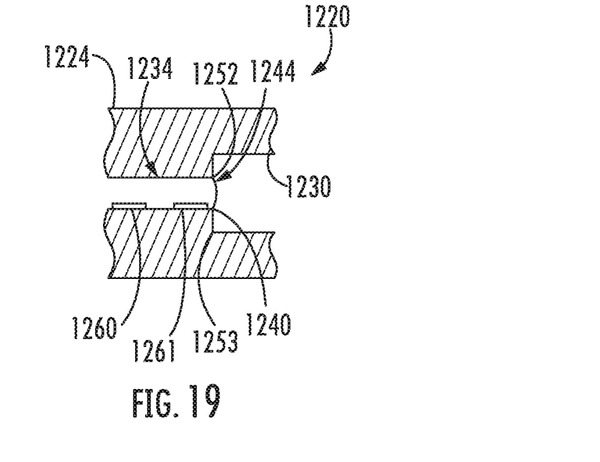
FIG. 19 is a side sectional view of the microfluidic valve of FIG. 18 taken along line 19-19.

FIGS. 18 and 19 are sectional views illustrating portions of an example microfluidic valve 1220. FIG. 18 is a top sectional view of microfluidic valve 1220 while FIG. 19 is a side sectional view of microfluidic valve 1220. Microfluidic valve 1220 comprises conduit 1224 having a fluid passage 1226, meniscus breaker 1260, sensor 1262, sensor 1263 and controller 1264.

Conduit 1224 comprises at least one layer of material forming fluid passage 1226. Fluid passage 1226 projects or extends off of a fluid supply passage or slot 1265. The fluid passage 1226 of conduit 1224 comprises liquid receiving portion 1230, spout 1232 and liquid supplying portion 1234. Spout 1232 is formed in the body of conduit 1224 and projects into portion 1230. Portion 1234 extends through spout 1232, where it is connected to portion 1230 at a constriction 1240. As shown by FIGS. 18 and 19, constriction 1240 is completely surrounded by corners or edges. As shown by FIG. 18, constriction 1240 comprises side corners or edges 1250. As shown by FIG. 19, constriction 1240 comprises ceiling edge 1252 and a floor edge 1253. The continuous edge of constriction 1240 formed at the end of spout 1232 provides a robust capillary meniscus 1244. Although the ceiling edge 1252 and floor edge 1253 are illustrated as having equal heights, in other implementations, the ceiling edge 1252 and the floor edge 1253 may have different heights.

In the example illustrated, spout 1232 comprises tapering sides 1255 that provide edges 1250 with an acute profile. This acute profile further inhibits creep of liquid beyond constriction 1240. In other implementations, spout 1232 may have other shapes at its end.

Meniscus breaker 1260 is similar to meniscus breaker 860 described above. Meniscus breaker 1260 is formed in portion 1234 and upon actuation, creates pressure pulses or other stimuli so as to controllably break the meniscus 1244. Meniscus breaker 1260 operates under the control of controller 1264.

Sensors 1262, 1263 comprise sensing devices that output signals from which controller 1264 may determine the state of valve 1220. In one implementation, sensors 1262, 1263 comprise sensing devices that output signals from which controller 1264 may determine whether meniscus 1244 exists or has been broken, or whether liquid is flowing through constriction 1240, i.e. the valve is open.

Sensor 1262 is located within portion 1230 of conduit 1224. In one implementation, sensor 1262 is located flush or along a floor, ceiling or sidewall of portion 1230 of conduit 1224 to reduce obstruction of flow when valve 1220 is opened. In one implementation, sensor 1262 may comprise a wet-dry sensor that senses the presence or absence of liquid. For example, in one implementation, sensor 1262 may comprise spaced electrodes of a circuit, wherein the circuit is completed when a liquid extends across and contacts the spaced electrodes. In such an implementation, a dry state may indicate that valve 1220 is presently closed, that meniscus is intact, and that no liquid is flowing through valve 1220. A wet state would indicate the presence of liquid across sensor 1262, indicating that meniscus 1244 has been broken and that valve 1220 has been opened. In other implementations, sensor 1262 may comprise other sensing devices, such as a flow sensor which senses the rate at which fluid or liquid is flowing across sensor 1262.

Sensor 1263 is located within portion 1234 of conduit 1224, upstream of portion 1230, on an opposite side of meniscus 1244 when valve 1220 is closed. In one implementation, sensor 1263 is located flush or along a floor, ceiling or sidewall of portion 1234 of conduit 1224 to reduce obstruction of flow when valve 1220 is opened. In one implementation, sensor 1263 is located proximate to constriction 1240 so as to detect the flow of liquid through constriction 1240. In one implementation, sensor 1263 may comprise a flow sensor that senses whether liquid is flowing or moving within portion 1234 of conduit 1224. In some implementations, sensor may comprise an electrical impedance sensor that senses the presence of liquid within portion 1234. In some implementations, sensor 1263 may have dual functions: sensing the flow of liquid through portion 1234 and sensing the number or count of cells or particles flowing through portion 1234 of conduit 1224 or the rate at which cells or particles carried in the liquid are flowing through portion 1234 of conduit 1224. In such implementations, sensor 1263 (schematically illustrated) may extend across the width of conduit 1234 such that particles or cells cannot flow around such a sensor without being counted.

Although sensors 1262, 1263 are depicted in the illustrated locations, sensor 1262, 1263 may be provided at other locations in the respective portions 1230 and 1234 of conduit 1224. In some implementations, portion 1230 may contain multiple spaced sensors 1262. In some implementations, portion 1234 may contain multiple spaced sensors 1263. In some implementations, one or both of sensors 1262, 1263 may be omitted.

Figure 20:
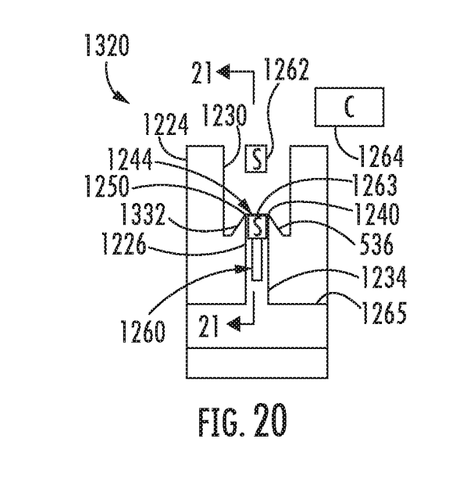
FIG. 20 is a top sectional view of portions of an example microfluidic valve.
Figure 21:
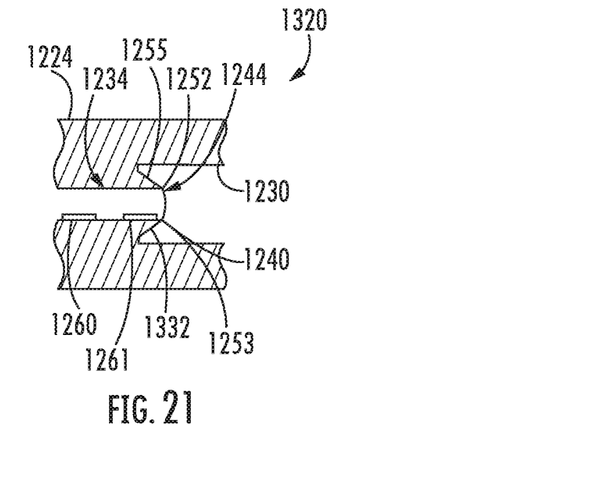
FIG. 21 is a side sectional view of the microfluidic valve of FIG. 20 taken along line 21-21

FIGS. 20 and 21 illustrate portions of an example microfluidic valve 1320. Valve 1320 is similar to valve 1220 described above except that valve 1320 comprises spout 1332 in place of spout 1232. Those remaining components of valve 1320 that correspond to components of valve 1220 are numbered similarly.

As shown by FIG. 21, spout 1332 is tapered about all sides so as to form a continuous acute edge about a junction of portion 1230 and 1234. In one implementation, edges 1250, 1252 and 1253 form a continuous edge that is circular. In another implementation, edges 1250, 1252 and 1253 form a continuous edge that is polygonal.

Figure 22:
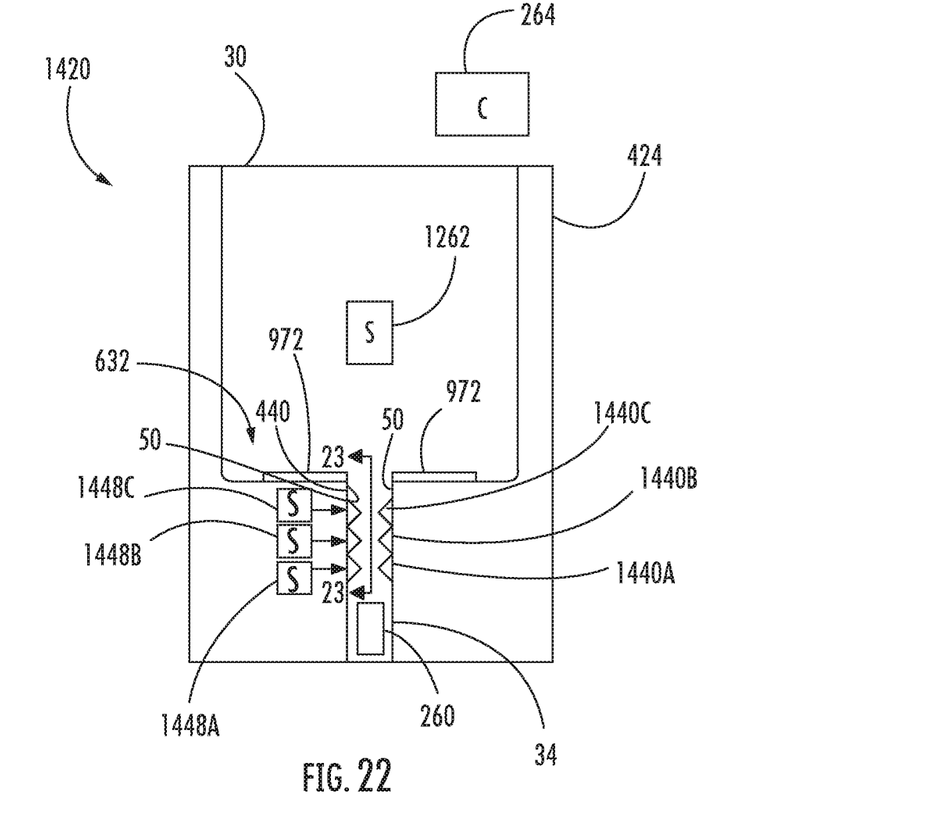
FIG. 22 is a top sectional view of portions of an example microfluidic valve.
Figure 23:
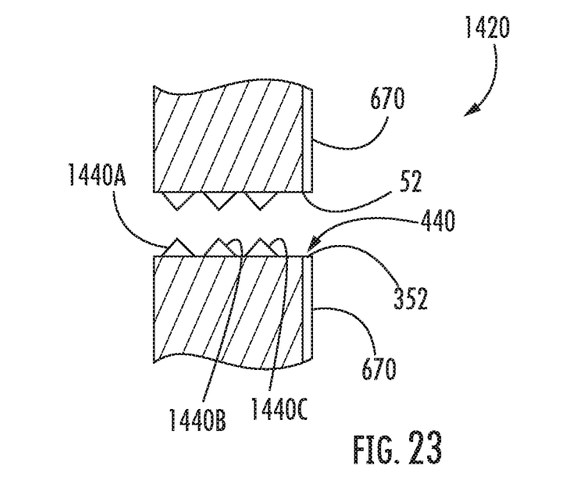
FIG. 23 is a side sectional view of the microfluidic valve of FIG. 22 taken along line 23-23.

FIGS. 22 and 23 are sectional views schematically illustrating portions of an example microfluidic valve 1420. Microfluidic valve 1420 is similar to microfluidic valve 620 described above except that microfluidic valve 1420 additionally comprises sensor 1262 (described above) and constrictions 1440A, 1440B, 1440C (collectively referred to as constrictions 1440) and sensors 1448A, 1448B and 1448C (collectively referred to as sensors 1448). Those remaining components of microfluidic valve 1420 that correspond to components of microfluidic valve 620 are numbered similarly.

Constrictions 1440 comprise narrowing regions arranged in series within portion 34. Constrictions 1340 provide multiple successive regions where the capillary meniscus may be formed at a liquid-fluid interface along portion 34, closing valve 1420. In one implementation, constrictions 1440 comprise a series of opposing teeth or annular rings spaced along portion 34, wherein the teeth continuously extend about the interior of portion 34 on both sides, the top and the bottom of portion 34. In one implementation, such multiple constrictions 1440, arranged in series, assist in reducing the likelihood of accidental or inadvertent opening of valve 1420 due to pressure fluctuations or variations in either of portions 30 or 34.

In one implementation, a liquid-fluid interface is formed at constriction 1440A, forming a capillary meniscus across constriction 1440A, wherein the capillary menisci across constriction 1440A closes valve 1420. In the event of inadvertent breaking or bursting of the capillary meniscus across constriction 1440A, liquid may flow through constriction 1440A and form a second capillary meniscus across constriction 1440B, once again closing valve 1420. In the event of inadvertent breaking or bursting of the capillary missed is across constriction 1440B, liquid may flow through constriction 1440B and form a third capillary meniscus across constriction 1440C, once again closing valve 1420 and inhibiting the flow of liquid into portion 30.

In the example illustrated, each of such constrictions 1440 has a width of less than or equal to 20 μm in one implementation, less than or equal to 10 μm. Although constriction 1440 are illustrated as being similar in size such that the capillary menisci formed across such constrictions have substantially similar burst pressure thresholds, the pressure at which such capillary menisci would break, in other implementations, constrictions 1440 may be differently shaped or differently sized such that the different constrictions 1440 result in different capillary menisci having different bursts or break pressure thresholds. For example, in one implementation, the different constrictions 1440 may be differently shaped or differently sized so as to provide capillary menisci having ever-increasing burst pressure thresholds as the constrictions 1440 approach portion 30. Although valve 1420 is illustrated as comprising three such constriction 1440 in portion 34, in other implementations, about 920 may have a greater or fewer of such supplemental constrictions 1440.

In the example illustrated, meniscus breaker 262 is situated sufficiently close to each of such constrictions 1440 so as to create pressure burst or pressure pulses in the liquid that are near the liquid-fluid interface so as to burst each capillary meniscus that forms across the different constrictions 1440. In one implementation, meniscus breaker 262 may be sequentially fired or actuated multiple times, once for each constriction 1440 and its associated capillary meniscus. In other implementations, meniscus breaker 262 may be fired or actuated a single time for a sufficient duration so as to break each of the capillary menisci that sequentially form across the constrictions 1440 or inhibit the formation of such capillary menisci once the initial capillary meniscus has been broken.

Sensors 1448 are similar to sensor 1262 described above. In the example illustrated, sensor 1448A is located within or along portion 34 between constrictions 1440A and 1440B. Sensor 1448B is located within or along portion 34 between constrictions 1440B and 1440C. Constriction 1448C is located within or along portion 34 between constrictions 1440D and 440. Each of such sensors 1448 output signals that facilitate the determination of the state of liquid flow in a particular volume by controller 264.

Based upon signals from sensor 1448A, controller 264 may determine whether a capillary meniscus is present at constriction 1440A. For example, in implementations where sensor 1448A comprise a wet-dry sensor, a dry state indicated by sensor 1448A may indicate the presence of a capillary meniscus at constriction 1440A, whereas a wet state may indicate that any such capillary meniscus previously extending across constriction 1340A has been broken. Based upon signals from sensors 1448A and 1448B, controller 264 may determine whether the capillary meniscus is present across constriction 1440B. Based upon signals from sensors 1448A, 1448B and 1448C, controller 264 may determine whether a capillary meniscus is present across constriction 1448C. Based upon signals from such sensors 1448, controller 264 may ascertain the risk of microfluidic valve 1420 being accidentally opened. Based upon signals from sensors 1448, controller 264 may determine whether meniscus breaker 262 should be actuated additional times or should be actuated to provide greater pulse pressure so as to break all of the capillary menisci and completely open valve 1420.

Although the present disclosure has been described with reference to example implementations, workers skilled in the art will recognize that changes may be made in form and detail without departing from the spirit and scope of the claimed subject matter. For example, although different example implementations may have been described as including features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A microfluidic valve comprising:
   a first portion of a liquid conduit to contain a fluid;
   a second portion of the liquid conduit to contain a liquid;
   a constriction between the first portion and the second portion and across which a capillary meniscus is to form between the fluid and liquid, wherein the constriction includes an interface where the liquid conduit changes from a larger flow passage to a smaller flow passage, the constriction comprising an edge along a ceiling of the microfluidic valve;
   additional constrictions comprising narrowing regions arranged in series within the second portion, the additional constrictions extending inward from an interior wall of the second portion; and
   sensors located between the additional constrictions and flush with the interior wall of the second portion.

2. The microfluidic valve of claim 1 further comprising a liquid phobic surface in the first portion proximate the constriction.

3. The microfluidic valve of claim 1, wherein the constriction further comprises a second edge along a floor of the microfluidic valve.

4. The microfluidic valve of claim 3, wherein the constriction further comprises a third edge along sides of the microfluidic valve.

5. The microfluidic valve of claim 4 further comprising a liquid phobic surface in the first portion proximate the constriction.

6. The microfluidic valve of claim 1, wherein the constriction further comprises a second edge along a side of the microfluidic valve.

7. The microfluidic valve of claim 6 further comprising a liquid phobic surface in the first portion proximate the constriction.

8. The microfluidic valve of claim 1, wherein the additional constrictions comprise a series of opposing teeth or annular rings spaced along the second portion.

9. The microfluidic valve of claim 8, wherein the teeth continuously extend about an interior of the second portion.

10. The microfluidic valve of claim 1, wherein the sensors are wet-dry sensors.

11. The microfluidic valve of claim 1, wherein the additional constrictions are differently shaped or differently sized from one another.

12. The microfluidic valve of claim 1, wherein the first portion of the liquid conduit is continuous with the second portion of the liquid conduit.

* * * * *